US008831579B2

(12) United States Patent
Yanai et al.

(10) Patent No.: US 8,831,579 B2
(45) Date of Patent: Sep. 9, 2014

(54) CALLER IDENTIFICATION FOR HANDS-FREE ACCESSORY DEVICE WIRELESSLY CONNECTED TO MOBILE DEVICE

(75) Inventors: Yoav Sachnovsky Yanai, Ottawa (CA); Marc Élis Meunier, Kitchener (CA); Christopher Pattenden, Waterloo (CA); Allan Jeffrey Stirrett, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 294 days.

(21) Appl. No.: 13/217,481

(22) Filed: Aug. 25, 2011

(65) Prior Publication Data

US 2013/0053009 A1 Feb. 28, 2013

(51) Int. Cl.
  H04W 4/16 (2009.01)
  H04M 1/57 (2006.01)
  H04M 1/60 (2006.01)

(52) U.S. Cl.
  CPC .......... *H04M 1/578* (2013.01); *H04M 2250/02* (2013.01); *H04M 1/6066* (2013.01); *H04M 1/6091* (2013.01)
  USPC ....................................................... 455/415

(58) Field of Classification Search
  USPC ........... 455/415, 558, 552, 411, 414.1, 575.1, 455/431; 704/260, E13.001; 379/201.01, 379/220.01, 201.04, 201.05, 221.02, 379/221.15, 229, 230, 233, 243, 88.19, 379/142.01, 88.03; 340/825.69; 370/316
  See application file for complete search history.

(56) References Cited

U.S. PATENT DOCUMENTS

| | | | |
|---|---|---|---|
| 7,020,119 B2 | 3/2006 | Goodings et al. | |
| 7,139,377 B2* | 11/2006 | Pinault | 379/201.01 |
| 7,990,907 B2* | 8/2011 | Allaway et al. | 370/316 |
| 2003/0114192 A1* | 6/2003 | Estes et al. | 455/558 |
| 2004/0162028 A1 | 8/2004 | Glover | |
| 2006/0153348 A1* | 7/2006 | Marappan | 379/88.19 |
| 2006/0183513 A1* | 8/2006 | Slamka et al. | 455/575.1 |
| 2009/0088140 A1* | 4/2009 | Caspi et al. | 455/415 |
| 2010/0029305 A1* | 2/2010 | Gupta | 455/466 |
| 2010/0197362 A1 | 8/2010 | Saitoh et al. | |
| 2010/0210316 A1 | 8/2010 | Okayasu | |
| 2010/0222031 A1* | 9/2010 | Carolan et al. | 455/414.1 |
| 2012/0238330 A1* | 9/2012 | Wu | 455/569.1 |

OTHER PUBLICATIONS

Examination Report from corresponding CA application No. 2,750,396 dated May 1, 2013.

* cited by examiner

*Primary Examiner* — Olumide T Ajibade Akonai
(74) *Attorney, Agent, or Firm* — Gowling Lafleur Henderson LLP (57) ABSTRACT

A method enables a mobile device to provide caller information stored on the mobile device to an accessory device that is connected wirelessly to the mobile device. The method includes establishing a short-range wireless connection between the mobile device and the accessory device, determining an incoming telephone number for an incoming telephone call, searching a directory stored on the mobile device for an entry matching the incoming telephone number, and transmitting caller data from the entry matching the incoming telephone number to the accessory device.

16 Claims, 5 Drawing Sheets

CALLER IDENTIFICATION FOR HANDS-FREE ACCESSORY DEVICE WIRELESSLY CONNECTED TO MOBILE DEVICE

CROSS-REFERENCE TO RELATED APPLICATIONS

This is the first application filed for the present technology.

TECHNICAL FIELD

The present technology relates generally to caller identification in telephony and, in particular, to caller identification and annunciation techniques for hands-free accessory devices that are wirelessly connected to mobile devices.

BACKGROUND

Hands-free accessory devices wirelessly connect to mobile devices via short-range wireless protocols, such as Bluetooth®. These accessory devices (also referred to herein as audio gateways) come in a variety of forms, including headsets, earpieces and visor-mounted car kits.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology enables a caller name stored in a directory on a mobile device to be provided to a hands-free accessory device for caller annunciation.

Although the present technology may apply to many different kinds of accessory devices and mobile communication devices, and to many different protocols (especially wireless protocols) the concepts may be readily illustrated in the concept of the Bluetooth® technology. The Bluetooth® Hands-Free Profile (HFP) provides basic capabilities to route audio packets of SCO or eSCO (Synchronous Connections and Extended Synchronous Connections) type between the mobile device or handset (HS) and the audio gateway (AG), i.e. the headset, car kit or other hands-free accessory device. In addition, the HFP provides for the exchange of control commands and indications relating to the setup, maintenance and termination of this audio streaming channel.

In its most rudimentary form, the HFP does not provide for the relaying of the remote caller identity from the HS to the AG. An optional feature, known as Caller Line Identification, allows the handset, on receipt of an incoming call from a remote subscriber, to relay the subscriber's number (but not name) using an HFP protocol-prescribed indication known as CLIP (short for calling line identification presentation). The CLIP message mechanism, however, only provides for the conveyance of the caller number. The Bluetooth® HFP specification mandates that the CLIP message be a part of the optional AT message scheme, and includes five parameters, of which only the first two are to be read by the destination HS device. The remaining parameters are to be ignored.

One implication of the way that the HFP messages are implemented is that only the caller's number is relayed from the phone to the connected accessory device (such as a headset or car kit).

The HFP specifications make no provisions for the exchange of the caller's name whether provided from the network or from the mobile device's phonebook. This is a limitation of the existing HFP protocol. The ability to relay the caller name to the Bluetooth® headset or car kit can be provided by implementing the Bluetooth Phone Book Access Profile (PBAP) on both the mobile device and the accessory device. However, there may be serious disadvantages to implementing this profile on an accessory device such as a headset or car kit, as explained below.

The Bluetooth Phone Book Access Profile (PBAP) provides a means to synchronize all phone book objects found on the phone (or mobile device) with the Bluetooth® accessory device. These objects include not only phone book entries but also call history (dialed numbers, received calls and missed calls). As to phone entries, which are always in a standard unencrypted vCard format, PBAP synchronizes them with the accessory device whether they are stored in the phone's memory or on the SIM card. PBAP therefore provides a means to obtain the caller name, as entered on the phone's address book. In addition, the accessory is provided with phone book and call history browsing capabilities.

Although PBAP provides one approach to caller identification, there are at least two significant disadvantages to this PBAP approach:

A first disadvantage is the overhead in terms of memory resources required to implement the PBAP on the accessory. Where the phone book entries are numerous, increased CPU resources may be required to match, in real time, the incoming caller's number with the phone book's entries.

A second disadvantage is data security. Allowing the accessory to carry a duplicate of a phone book with all its entries and call history details is a potential security concern. Because these entries are or may be unencrypted and there are or may be no log-in credentials or password required to access the data on the accessory, this duplicated data may be vulnerable. Furthermore, as a general matter, more copies of sensitive information creates an increased risk of loss of control of that information. In some circumstances, for example, a user may be at risk of misplacing or otherwise losing control of a (possibly less-secure) accessory device, perhaps while maintaining control of a (perhaps more-secure) mobile device. The PBAP approach thus gives rise to potential privacy concerns.

Another related technology is disclosed in U.S. Patent Application Publication 2006/0183513 (Slamka et al.) which describes an audio caller ID technique for mobile telephone headsets. This technology uses voice tags recorded by the user for contacts stored in a personal directory. Upon receipt of an incoming call, the number is correlated in the personal directory to identify a contact. The voice tag associated with the identified contact is then played audibly to announce that this contact is calling. In the absence of a voice tag, voice-synthesized numerals corresponding to the telephone number of the incoming call are provided to the headset as an audio caller ID. A disadvantage of this technique is that it requires that the user pre-record voice tags for all of the contacts.

The present specification and the appended drawings describe a different approach. The technology described herein may address some or all of the foregoing concerns, but is not limited merely to addressing the particular concerns that have been identified.

One aspect of the present technology is a method for a mobile device to provide caller information (also referred to herein as caller data) stored on the mobile device to an accessory device that is connected wirelessly to the mobile device. As will be discussed below, caller information may include a complete or shortened name of a caller with some other information about the caller (and the user can in some situations decide what information is to be included in the caller information). The method includes establishing a short-range wireless connection between the mobile device and the accessory device (which enables the mobile device to transmit information-including the caller information-wirelessly to the accessory device, and which enables the accessory device to receive that information), determining an incoming telephone number for an incoming telephone call, searching a directory stored on the mobile device for an entry matching the incoming telephone number, and transmitting caller data from the entry matching the incoming telephone number to the accessory device. In one implementation, the searching may be performed with a non-linear search algorithm which is generally much faster than a linear algorithm, although the latter may also be employed.

Another aspect of the present technology is a computer-readable medium upon which are stored instructions in code that are configured or programmed to perform the foregoing method when the code stored in the computer-readable medium is loaded into memory and executed on a processor of a mobile device.

Another aspect of the present technology is a related or complementary method for an accessory device that is connected wirelessly to a mobile device to provide audible caller information. The method entails establishing a short-range wireless connection between the accessory device and the mobile device, receiving caller data matching an incoming telephone number from a directory stored on the mobile device, and providing the audible caller information based on the caller data.

Another aspect of the present technology is a mobile device comprising a short-range wireless transceiver for establishing a short-range wireless connection between the mobile device and an accessory device, a radiofrequency transceiver for receiving an incoming telephone call, and a processor operatively coupled to memory for determining an incoming telephone number corresponding to the incoming telephone call and for searching a directory stored on the mobile device for an entry matching the incoming telephone number and for instructing the short-range wireless transceiver to transmit caller data from the entry matching the incoming telephone number to the accessory device.

Another aspect of the present technology is a hands-free accessory device comprising a short-range wireless transceiver for establishing a short-range wireless connection between the accessory device and a mobile device and for receiving caller data matching an incoming telephone number from a directory stored on the mobile device and a text-to-speech module for providing the audible caller information based on the caller data.

Another aspect of the present technology is a system comprising a mobile device wirelessly connected to a hands-free accessory device. The system comprises a mobile device including a short-range wireless transceiver for establishing a short-range wireless connection between the mobile device and an accessory device, a radiofrequency transceiver for receiving an incoming telephone call, a processor operatively coupled to memory for determining an incoming telephone number corresponding to the incoming telephone call and for searching a directory stored on the mobile device for an entry matching the incoming telephone number and for instructing the short-range wireless transceiver to transmit caller data from the entry matching the incoming telephone number to the accessory device. The hands-free accessory device includes a short-range wireless transceiver for receiving the caller data and a text-to-speech module for providing the audible caller information based on the caller data.

The details and particulars of these aspects of the technology will now be described below, by way of example, with reference to the attached drawings.

Figure 1:
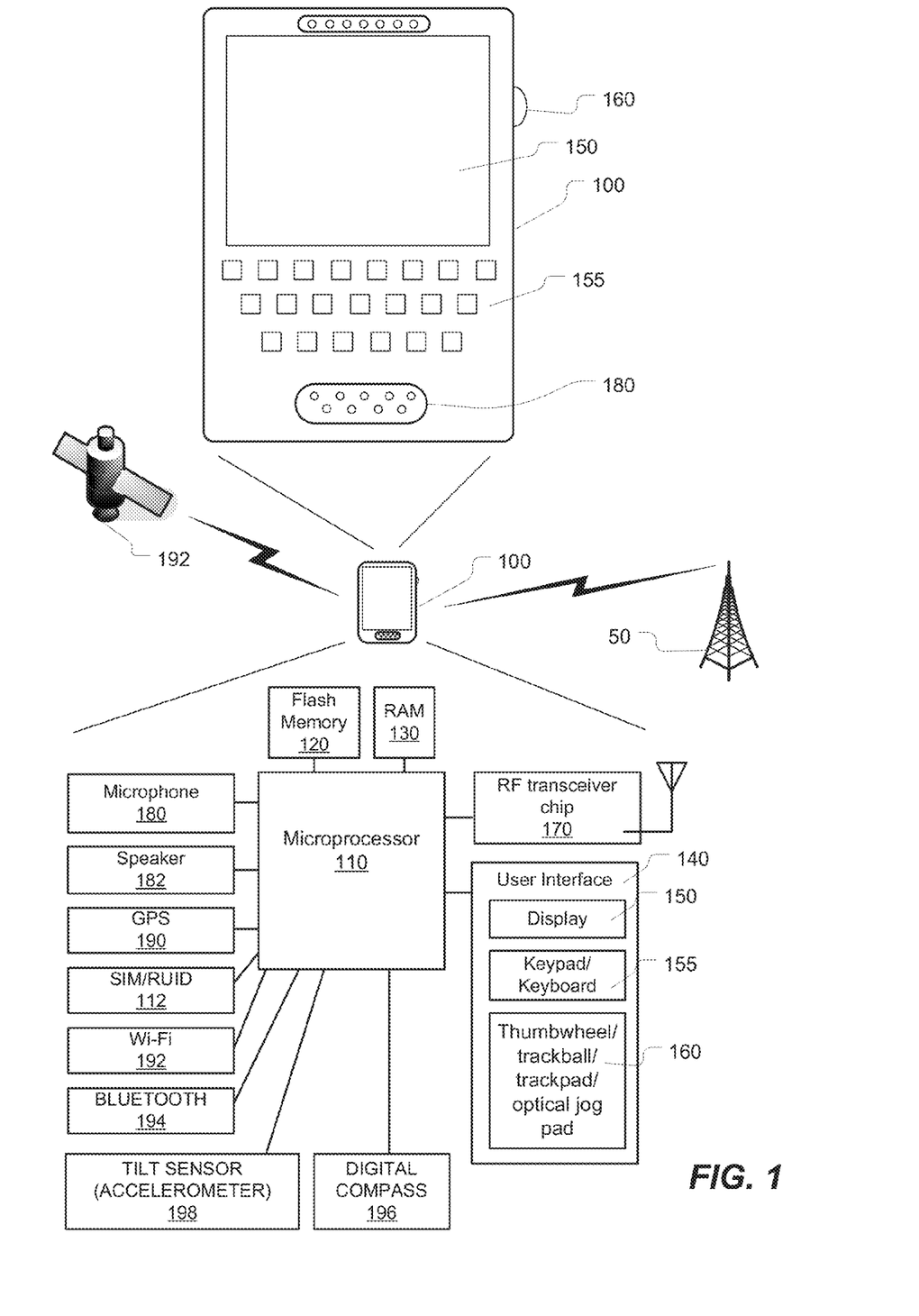
FIG. 1 is a depiction of a mobile device that may be used to implement the present technology.

FIG. 1 is a schematic depiction of one example of a mobile device, generally designated by reference numeral 100, on which the present technology can be implemented. It should be expressly understood that this figure is intentionally simplified to show only certain main components. The mobile device 100 may include other components beyond what is illustrated in FIG. 1. Mobile device 100 may be any of several electronic devices that are readily portable from place to place, and that may include a portable power supply (such as a battery) that enable portability. Mobile device 100 may include, for example, any device with communication capability, such as a cellular telephone, smart phone, tablet computer, global positioning system (GPS) device, media player, or the like. Mobile device 100 may be handheld, that is, sized and shaped to be held or carried in a human hand. In some embodiments, mobile device 100 may be included in a larger (and perhaps not handheld) device, such as a cellular telephone built into an automobile.

As depicted by way of example in FIG. 1, the mobile device 100 includes a microprocessor 110 (or simply a "processor") which interacts with memory. In other words, the processor 110 is operatively coupled to the memory in that the processor 110 and the memory may communicate, share information, and work together. The memory may include flash memory 120 and/or random access memory (RAM) 130. The mobile device includes one or more input/output devices or user interfaces 140, such as a display screen 150 (e.g. a small LCD screen or touch-sensitive display screen), and a keyboard or keypad 155. The user interface may also include a thumb-wheel, trackball, track pad or optical jog pad 160. In some embodiments, the mobile device 100 may include a touch screen that displays visual information and serves as a user input device. The mobile device may also include one or more ports for wired connections (e.g. USB, HDMI, Firewire, etc.). Although some aspects of the present technology may be adapted to wired connections between the mobile device 100 and an accessory device, it will be assumed for purposes of explanation that the present technology is expected to be adapted to wireless connections between the mobile device 100 and the accessory device.

Where the mobile device 100 is a wireless communications device, the mobile device 100 further includes a radiofrequency (RF) transceiver 170 for communicating wirelessly with one or more base stations over a cellular wireless network using cellular communication protocols and standards for both voice call and packet data transfer such as GSM, CDMA, GPRS, EDGE, UMTS, LTE, etc. The mobile device may include a Subscriber Identity Module (SIM) card 112 for GSM-type devices or a Re-Usable Identification Module (RUIM) card for CDMA-type devices. The RF transceiver 170 may include separate voice and data channels.

For telephony, the mobile device 100 may include a microphone 180 and a speaker 182 (and optionally an earphone jack).

The mobile device 100 may also include a positioning system such as a Global Positioning System (GPS) receiver (chipset) 190 for receiving GPS radio signals transmitted from one or more orbiting GPS satellites 192. Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

In the implementation depicted by way of example in FIG. 1, the mobile device includes a short-range wireless transceiver. This short-range wireless transceiver 194 may be a Bluetooth® transceiver.

The mobile device 100 may optionally include a Wi-Fi™ transceiver 192 and/or a near-field communications (NFC) chip. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver. The mobile device may optionally include other sensors like a digital compass 196 and/or a tilt sensor 198.

Figure 2:
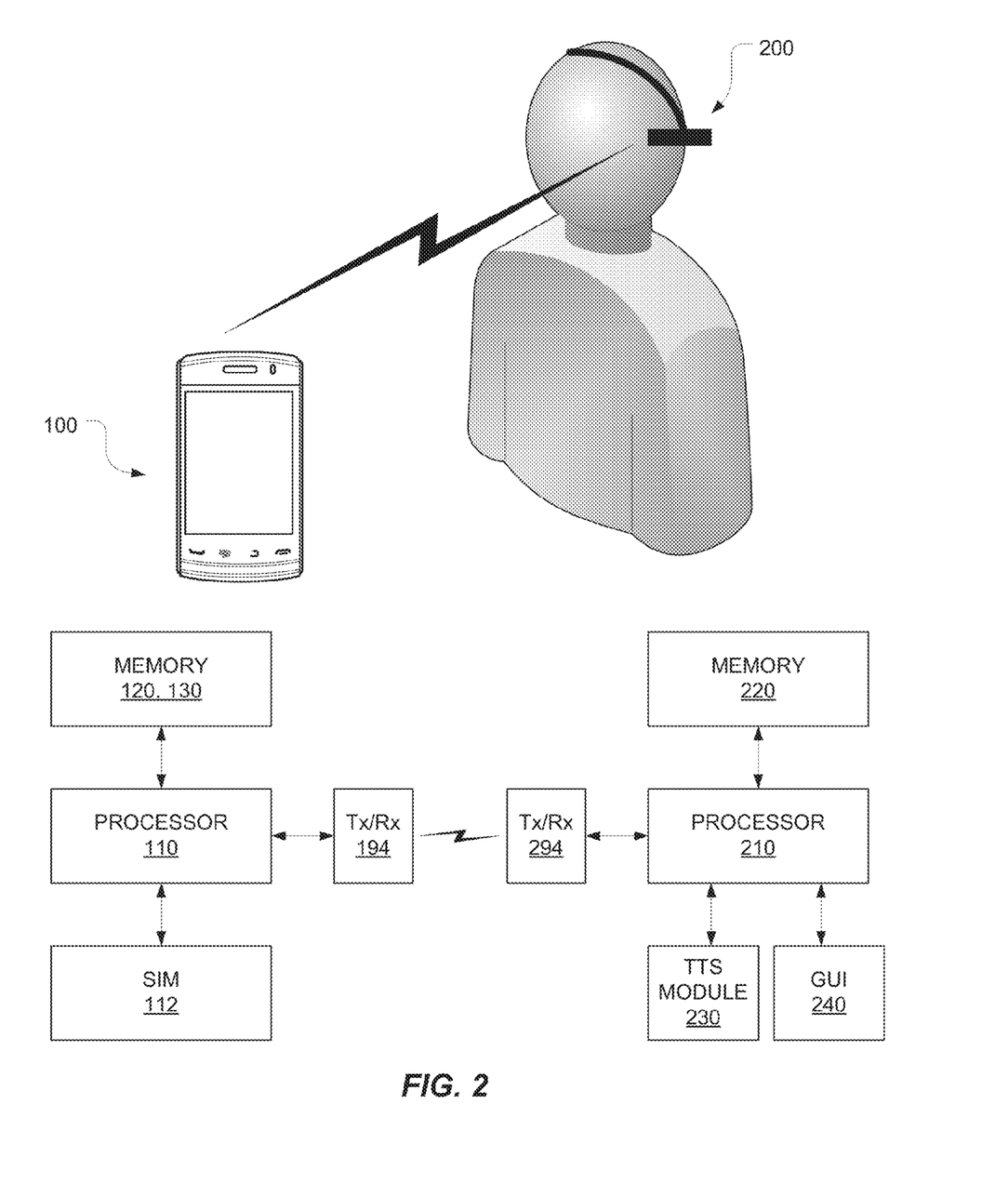
FIG. 2 is a depiction of a system including a hands-free accessory device wirelessly connected to a mobile device.

FIG. 2 is a schematic depiction of a system that includes a hands-free accessory device 200 that may be connected wirelessly (or "paired", e.g., via Bluetooth®) to the mobile device 100 such as the mobile device depicted in FIG. 1. The wireless connection may be set up or established in any fashion, may have any range (although for simplicity it will be assumed that the wireless connection is short-range), and the communication using that connection my employ any degree of encryption or other security. Examples of a hands-free accessory device are Bluetooth® headsets, earpieces, and visor-mounted car kits. The accessory device 200 includes a short-range wireless transceiver 294 (e.g., a Bluetooth® transmitter). As depicted by way of example in FIG. 2, the accessory device 200 includes a processor 210 and memory 220. The accessory device 200 includes a text-to-speech module 230 (or other equivalent means for providing audible caller annunciation) and optionally also a GUI 240 for visually displaying the caller name or other caller data.

For the purposes of this specification, the expression "short-range wireless" refers to any UHF or SHF wireless technologies, such as Bluetooth® that operates in the 2.4 GHz band, ZigBee® that operates in the ISM radio bands, i.e. 868 MHz in Europe, 915 MHz in the USA and Australia and 2.4 GHZ in other jurisdictions, Wi-Fi® that operates in the 2.4 GHz or 5 GHz bands, or Ultra Wide Band (UWB) that operates in the 3.1-10.6 GHz band.

Figure 3:
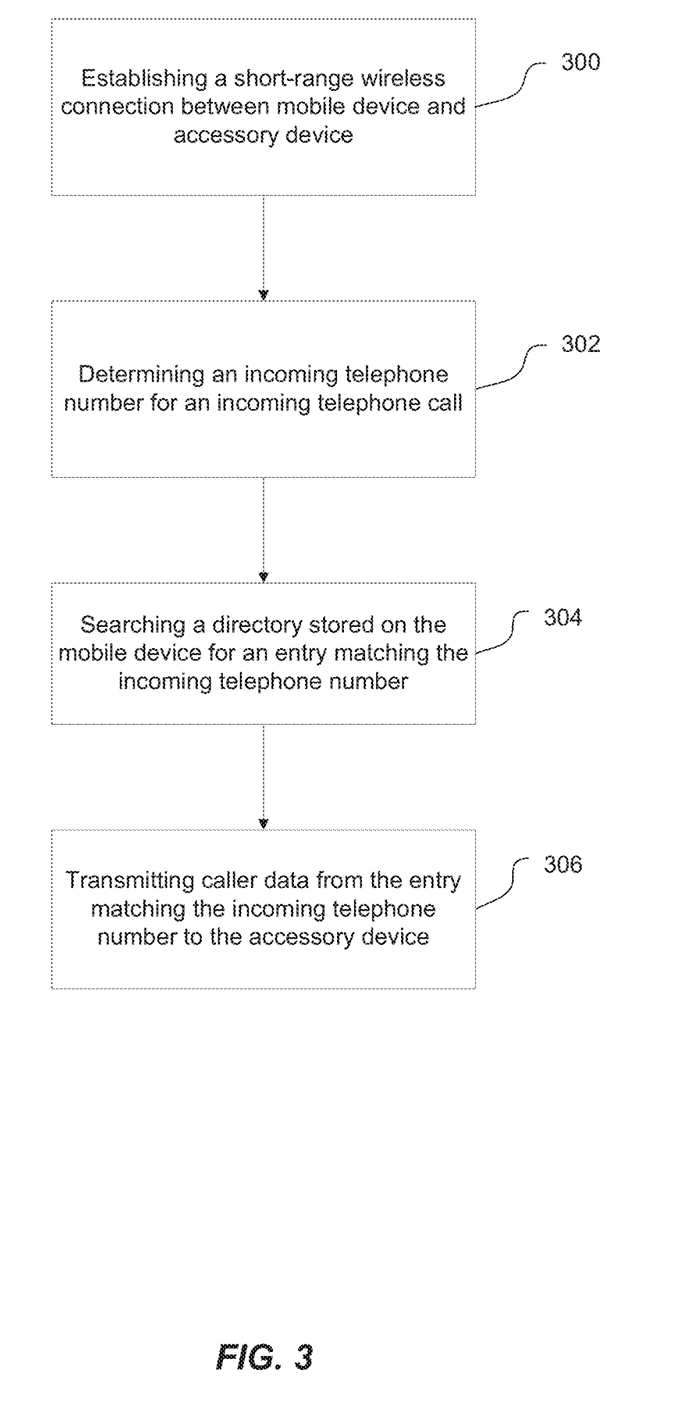
FIG. 3 is a flowchart depicting steps of a method performed by the mobile device (handset) in accordance with one implementation of the present technology.

The present technology generally provides a method for a mobile device to provide (that is, to supply or convey) caller information stored on the mobile device to an accessory device that is connected wirelessly to the mobile device. As depicted by way of example in FIG. 3, the method includes optionally establishing (300) a short-range wireless connection between the mobile device and the accessory device, determining (302) an incoming telephone number for an incoming telephone call, searching (304) a directory stored on the mobile device for an entry matching the incoming telephone number, and transmitting (306) caller data from the entry matching the incoming telephone number to the accessory device. Generally speaking, determining the incoming telephone number for an incoming telephone call entails identifying the caller by a number (conventionally, caller identification is by number rather than by name). The incoming caller's telephone number may be supplied to the mobile device 100 by the incoming call itself. This method departs from the conventional PBAP profile methodology and instead uses the number provided by the network for searching for the matching entry on the mobile device (AG) itself. This is generally more efficient because the mobile device often has a faster processor than the accessory device. Executing the search algorithm on the processor of the mobile device rather than on the much slower accessory device enables, in one implementation, the use of an improved search algorithm. By introducing hashing or any other sophisticated search algorithm, the speed of matching the incoming number with a corresponding address book entry may be significantly enhanced. By contrast, if the conventional PBAP profile method is used, the number is relayed to the accessory device to perform the search. Because the processor of the accessory device is typically much slower than the processor of the mobile device and with the linear search algorithm used by PBAP, matching of the number with the address book entry may be slower. The use of a linear algorithm by PBAP on the accessory device will typically yield an O(n) search where the latency increases linearly with the number of entries in the address book. By performing the search on the phone or mobile device instead, it may be possible to implement a non-linear (e.g., O(log n)) search algorithm, which is generally much faster.

A complementary method is performed by the accessory device 200. As depicted by way of example in FIG. 4, a method for an accessory device that is connected wirelessly to a mobile device provides audible caller information. The method entails optionally establishing (400) a short-range wireless connection between the accessory device and the mobile device, receiving (402) caller data matching an incoming telephone number from a directory stored on the mobile device, and providing (404) (e.g., generating, supplying or otherwise conveying) the audible caller information based on the caller data. As noted in the preceding paragraph, because the caller data is determined by the mobile device, e.g. using a non-linear search algorithm, the computational burden on the accessory is greatly alleviated, thereby freeing the processor of the accessory for other tasks and reducing its battery draw.

Figure 4:
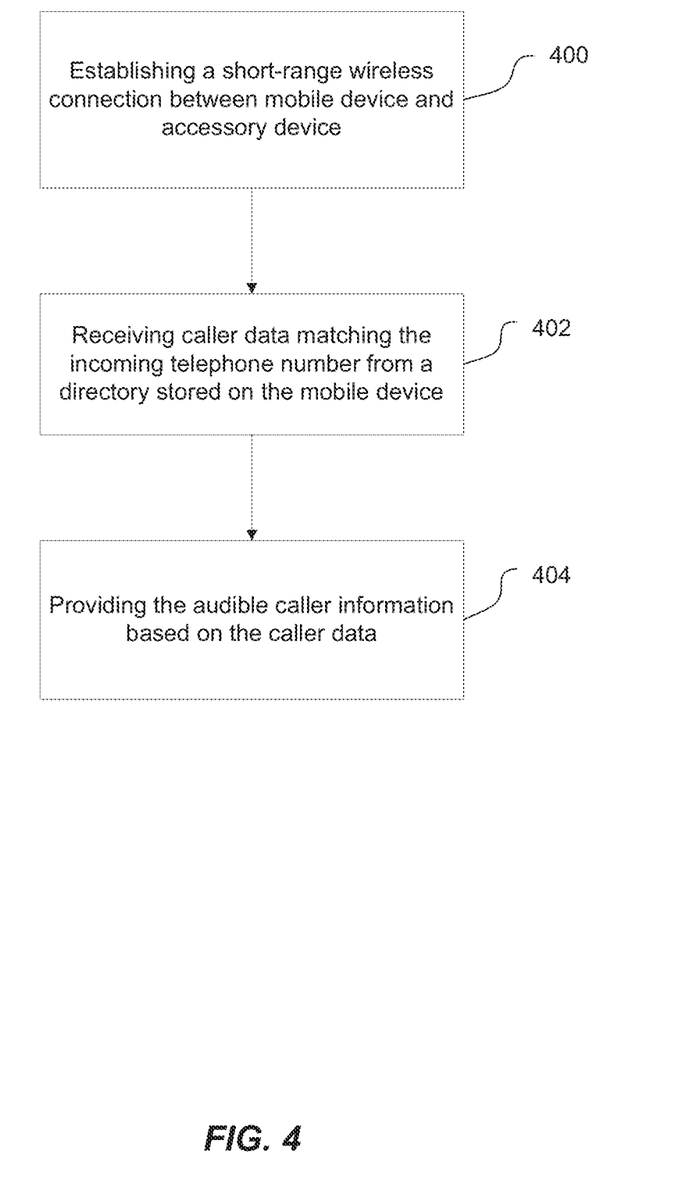
FIG. 4 is a flowchart depicting steps of a complementary method performed by the accessory device (audio gateway) in accordance with one implementation of the present technology.

The technology thus provides a method to relay, when an incoming call is received by an accessory device (audio gateway), the remote caller name to the accessory device (handset or car kit) without the need to implement PBAP on either the phone or on the accessory device. From the user's point of view, an incoming call is audibly announced by an announcement of the name of the caller in spoken language (as generated by the text-to-speech module 230 of the accessory device 200, for example). An incoming call may also be announced with other audible or visual cues (such as vibration of the mobile device or sounding of a ringtone). A user may hear, for example, a brief ringtone (e.g., from the mobile device 100, the accessory device 200, or both), which cues the user that a call is incoming, followed by a recitation of the name of the caller. The user may then decide whether or not to answer or accept the incoming call.

In one implementation, the caller name is conveyed using a standard HFP CLIP indication, as an extra parameter, in the form of a standard UTF-8 string (although other formats made by employed in other adaptations). That string is then used as an input to a text-to-speech (TTS) module 230 on the accessory device 200 to announce to the user, in real time, the name of the caller.

Figure 5:
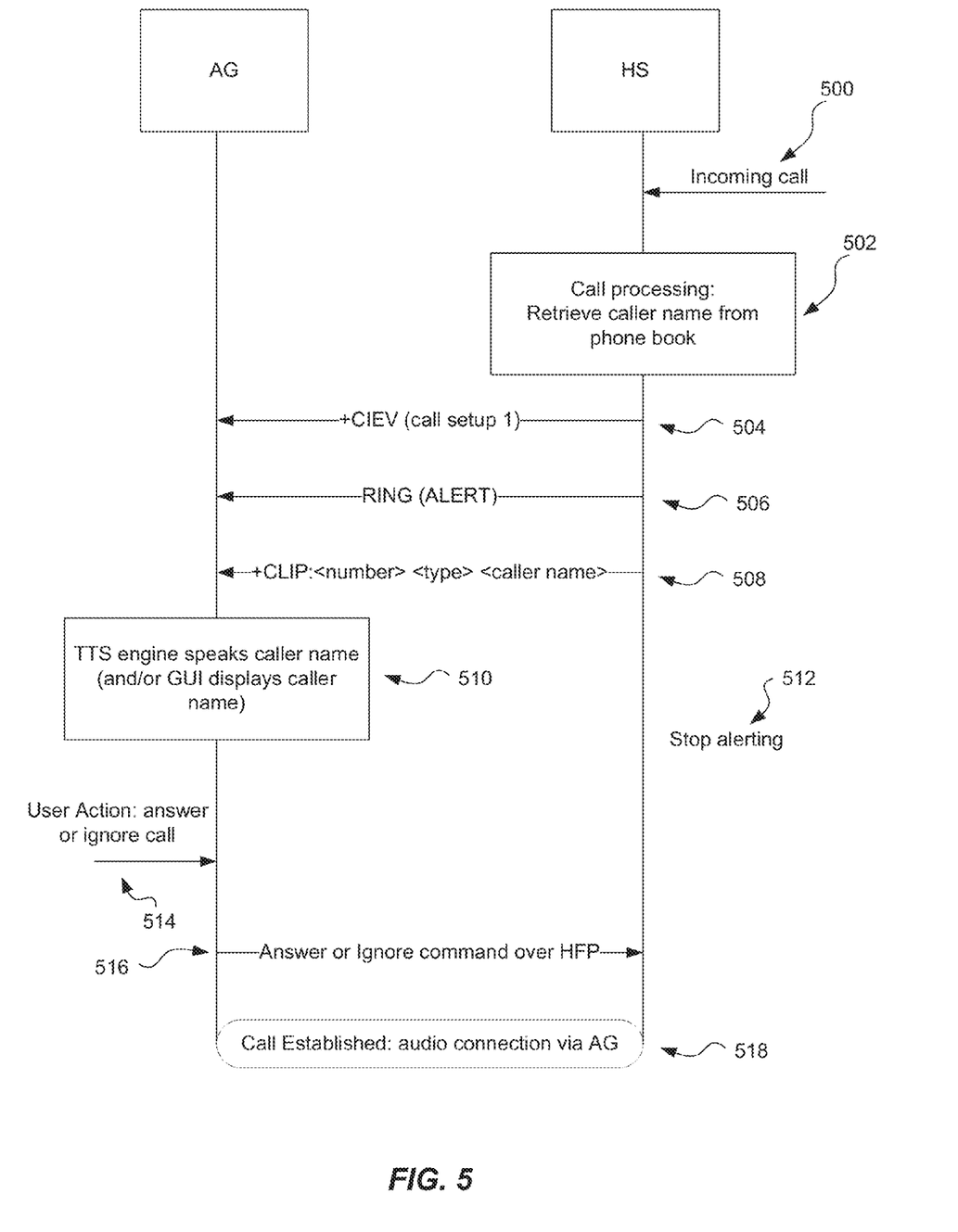
FIG. 5 is a data flow diagram showing a messaging/signalling sequence between a handset and an audio gateway in one implementation of the present technology.

This caller name retrieval process may be implemented as depicted in FIG. 5. As shown by way of example in FIG. 5, when a remote caller calls the phone or mobile device (step 500), the phone (mobile device) matches the incoming caller number with any phone book entry (directory entry) corresponding to that number (step 502). If a match is found, an ASCII string representing the caller name, as stored in the phone book in the memory of the mobile device (handset) or on its SIM card, is appended to the standard HFP CLIP message (step 508), and relayed wirelessly over the Bluetooth® link to the accessory device 200 along with an incoming call alert (504, 506). The sequence of steps 504, 506, 508 may be varied from what is shown. The text-to-speech (TTS) module speaks the caller name (step 510). Optionally, a GUI on the accessory device may display the caller name in addition to the audible annunciation of the caller name. The user action, i.e. to answer or ignore the call (step 514), causes the alert to stop (step 512). An answer command or an ignore command is sent using HFP to the accessory device (step 516). If the answer command is sent, the audio link or audio connection between the mobile device (handset) and the accessory device (audio gateway) is established (at step 518).

According to the Bluetooth HFP protocol, the HFP CLIP message is not expected to carry any parameters other than those specifically mentioned in the HFP protocol: the caller number and the number type. In this implementation, however, an additional or extra field is provided to accommodate a string (the caller's name).

Implementing the caller name indication using HFP extends the Bluetooth HFP specification, and generally entails implementation on both the accessory device (audio gateway) and the mobile device (i.e. handset or phone) with which it is paired (wirelessly connected).

The mobile device 100 is thus configured to search for and retrieve from the directory (phone book, address book, contacts list, etc.) stored in memory or on the SIM card (or both) an entry matching the incoming number (at call processing step 502). In general, searching a directory for a matching entry includes matching the incoming telephone number to related caller information that is stored on the mobile device 100. In other words, the matching entry generally includes some or all of caller information that will be transmitted to the accessory device. This may be accomplished using a hashing algorithm to speed up the retrieval process, but the technology disclosed herein is not limited to any particular technique for matching an incoming call by number to any particular caller information. The mobile device composes a string representing (in a typical example) the caller name and populates the caller name field in the CLIP message.

The accessory device 200 is configured to expect the caller name as an extra (non-prescribed) parameter included in the incoming CLIP message. The accessory device 200 is configured to use the incoming string in the caller name field to notify the user of the caller's identity. This can be done audibly in the form of audible output using for example a text-to-speech (TTS) module and/or visually in the form of a visual display on the GUI of the accessory device 200.

This technology enables the accessory device 200 to retrieve caller name information (or other information related to the caller) from the phone book, address book or personal directory stored in memory or on the SIM card of the mobile device (handset) 100 without disadvantages associated with conventional techniques. Notably, since the address book data is not duplicated onto the accessory device, this technology does not give rise to certain data security issues that may arise from duplicating data. In addition, this approach does not burden the processor and/or memory resources of the accessory device 200. Furthermore, no voice tags are required to implement this approach. Implementation of one or more embodiments may yield other benefits as well, such as enhanced efficiency or safety, or more expedited call-handling. Furthermore, the present technology is flexible and adaptable to a variety of wireless connections, a variety of wireless communication protocols, a variety of mobile devices and a variety of accessory devices. The present technology may also be adaptable to circumstances in which an incoming call is identified by more than a number, and may also be further advantageous in that users may customize the kind or extent of caller information that may be audibly announced by the accessory device (as discussed below).

A similar method may be used not only for relaying the caller name or any other caller data for a first incoming call, but also for relaying the caller name for a waiting call. The HFP standard message for relaying a second incoming call indication from the mobile device 100 (or phone) to the accessory device 200 is known as AT+CCWA. This is the standard "call waiting notification" AT command used by the HFP profile. The same mechanism used by the CLIP message can be used to achieve the same end—relaying to the accessory device the caller name of a second incoming call or a waiting call without any need to rely on the PBAP implementation. From the user's point of view, the user may be having a hands-free conversation with a first caller, when a second incoming call is received. The user may hear, in spoken language, the name of the second caller (optionally, the user's mobile device 100, accessory device 200, or both may be muted automatically to keep the audible information about identity of the second caller secret from the first caller). The user may then choose how to handle the first and second callers.

In the foregoing examples, the caller data that is relayed to the accessory device is the caller name as stored in the directory on the mobile device. The caller name may be the complete name showing in the directory, just the first name or a nickname or a familiar name (such as "Dad") stored in the directory in association with the caller. In other implementations, the caller data may include other information about the caller stored in the directory. For example, the caller data may include the name of the company or organization with whom the caller is employed or otherwise associated. The caller data may include the city, country or other geographical entity. In these examples, the caller annunciation might include both the caller's name and the other information about the caller, e.g. "Bob calling from ABC Company" or "Bob calling from Miami". Optionally, the user may customize what caller information will be conveyed to the accessory device or audibly announced.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method for a mobile device to provide caller information stored on the mobile device to an accessory device that is connected wirelessly to the mobile device, the method comprising:
   determining an incoming telephone number for an incoming telephone call;
   searching a directory stored on the mobile device for an entry matching the incoming telephone number; and
   transmitting, to the accessory device, caller data from the entry matching the incoming telephone number by generating and transmitting a Calling Line Identification Presentation (CLIP) message containing an extra field for the caller data.

2. The method as claimed in claim 1 wherein the wireless connection is a Bluetooth® connection.

3. The method as claimed in claim 2 further comprising:
   composing, based on searching for an entry matching the incoming telephone number, a text string representing a caller name; and
   inserting the text string into the extra field.

4. A method for an accessory device that is connected wirelessly to a mobile device to provide audible caller information, the method comprising:
   receiving a Calling Line Identification Presentation (CLIP) message from the mobile device, the CLIP message including an extra field that contains caller name data from a directory stored on the mobile device, the caller name data corresponding to an incoming telephone number; and
   providing the audible caller information based on the caller name data contained in the extra field of the CLIP message.

5. The method as claimed in claim 4 wherein the wireless connection is a Bluetooth® connection.

6. The method as claimed in claim 5 wherein providing the audible caller information comprises:
   providing a text string stored in the extra field representing a caller name to a text-to-speech module; and
   audibly annunciating the caller name using the text-to-speech module.

7. A mobile device comprising:
   a short-range wireless transceiver for establishing a short-range wireless connection between the mobile device and an accessory device;
   a radiofrequency transceiver for receiving an incoming telephone call; and
   a processor operatively coupled to memory for determining an incoming telephone number corresponding to the incoming telephone call and for searching a directory stored in the memory for an entry matching the incoming telephone number and for instructing the short-range wireless transceiver to transmit caller data from the entry matching the incoming telephone number to the accessory device by generating a Calling Line Identification Presentation (CLIP) message containing an extra field for the caller data.

8. The mobile device as claimed in claim 7 wherein the short-range wireless transceiver is a Bluetooth® transceiver.

9. A hands-free accessory device comprising:
   a short-range wireless transceiver for establishing a short-range wireless connection between the accessory device and a mobile device and for receiving from the mobile device a Calling Line Identification Presentation (CLIP) message with an extra field that contains caller name data from a directory stored on the mobile device, the caller name data corresponding to an incoming telephone number; and
   a text-to-speech module for providing audible caller information based on the caller name data.

10. The accessory device as claimed in claim 9 wherein the short-range wireless transceiver is a Bluetooth® transceiver.

11. A system for providing audible caller information for an incoming call, the system comprising:
   a mobile device including:
   a short-range wireless transceiver for establishing a short-range wireless connection between the mobile device and an accessory device;
   a radiofrequency transceiver for receiving an incoming telephone call; and
   a processor operatively coupled to memory for determining an incoming telephone number corresponding to the incoming telephone call and for searching a directory stored in the memory of the mobile device for an entry matching the incoming telephone number, for generating a Calling Line Identification Presentation (CLIP) message with an extra field containing caller data and for instructing the short-range wireless transceiver to transmit caller data from the entry matching the incoming telephone number to the accessory device; and
   a hands-free accessory device connected wirelessly to the mobile device, the accessory device including:
   a short-range wireless transceiver for receiving the caller data; and
   a text-to-speech module for providing the audible caller information based on the caller data.

12. The system as claimed in claim 11 wherein the mobile device and the accessory device each comprises a Bluetooth® transceiver.

13. The system as claimed in claim 12 wherein the mobile device searches a directory stored in memory.

14. The system as claimed in claim 12 wherein the mobile device searches a directory stored in on a SIM card.

15. The system as claimed in claim 12 wherein the accessory device audibly provides the caller data that includes a caller name.

16. The system as claimed in claim 15 wherein the accessory device audibly provides the caller data that further includes additional caller information obtained from the entry in the directory.

* * * * *